United States Patent
Gust et al.

(10) Patent No.: US 9,499,204 B1
(45) Date of Patent: Nov. 22, 2016

(54) SUSPENSION SYSTEM AND RIDE-ON GROUNDS MAINTENANCE VEHICLE INCORPORATING SAME

(71) Applicant: THE TORO COMPANY, Bloomington, MN (US)

(72) Inventors: Jackie R. Gust, Northfield, MN (US); David J. Scherbring, Savage, MN (US); Jeffrey W. Stern, Savage, MN (US); André A. Sheats, Blaine, MN (US)

(73) Assignee: The Toro Company, Bloomington, MN (US)

( * ) Notice: Subject to any disclaimer, the term of this patent is extended or adjusted under 35 U.S.C. 154(b) by 0 days.

(21) Appl. No.: 14/704,062

(22) Filed: May 5, 2015

(51) Int. Cl.
| | |
|---|---|
| *B62D 21/11* | (2006.01) |
| *A01D 34/64* | (2006.01) |
| *A01D 34/82* | (2006.01) |
| *A01D 67/00* | (2006.01) |
| *A01D 67/04* | (2006.01) |

(52) U.S. Cl.
CPC .............. *B62D 21/11* (2013.01); *A01D 34/64* (2013.01); *A01D 34/82* (2013.01); *A01D 67/00* (2013.01); *A01D 67/04* (2013.01)

(58) Field of Classification Search
CPC ...... B62D 21/11; A01D 67/00; A01D 34/64; A01D 34/82; A01D 67/04
See application file for complete search history.

(56) References Cited

U.S. PATENT DOCUMENTS

| | | |
|---|---|---|
| 2,303,567 A | 12/1942 | McWhorter et al. |
| 2,531,572 A | 11/1950 | Knoedler |
| 2,538,954 A | 1/1951 | Efromson et al. |
| 2,573,077 A | 10/1951 | White et al. |
| 2,707,986 A | 5/1955 | Johnson |
| 2,800,948 A | 7/1957 | Omon et al. |
| 2,829,703 A | 4/1958 | Knoedler |
| 2,868,273 A | 1/1959 | Barrett |

(Continued)

FOREIGN PATENT DOCUMENTS

| | | |
|---|---|---|
| EP | 0 081 313 A1 | 6/1983 |
| EP | 0 426 510 A1 | 5/1991 |

(Continued)

OTHER PUBLICATIONS

"Grasshopper 620T OPS (Operator Protective Structure) and Seat Assembly." Parts Diagram [online]. The Mower Shop, Inc. 2007 [retrieved Sep. 9, 2015]. Retrieved from the Internet: <URL:www.the-mower-shop-inc.com/620t_2007_ops_seat_assembly.aspx>; 4 pages.

(Continued)

*Primary Examiner* — Drew Brown
(74) *Attorney, Agent, or Firm* — Mueting, Raasch & Gebhardt, P.A.

(57) ABSTRACT

A suspension system for use with a grounds maintenance vehicle such as a ride-on lawn mower. In one embodiment, the suspension system provide at least a first suspension apparatus positioned between a chassis of the mower and an operator support platform. The first suspension apparatus may include one or more suspension units that may be quickly reconfigured to provide variable suspension characteristics. The system may also include a second suspension apparatus longitudinally spaced-apart from the first suspension apparatus. A pivot member may be provided to assist in reducing or eliminating all but certain degrees of freedom of the platform relative to the chassis.

20 Claims, 10 Drawing Sheets

(56) References Cited

U.S. PATENT DOCUMENTS

| | | | |
|---|---|---|---|
| 2,900,161 A | 8/1959 | Crede | |
| 2,911,207 A | 11/1959 | Coble, Jr. et al. | |
| 2,987,291 A | 6/1961 | Dyson | |
| 2,991,970 A | 7/1961 | White et al. | |
| 3,006,593 A | 10/1961 | Plate et al. | |
| 3,177,962 A | 4/1965 | Bailey | |
| 3,358,958 A | 12/1967 | Russa | |
| 3,420,568 A | 1/1969 | Henriksson et al. | |
| 3,732,941 A | 5/1973 | Davis et al. | |
| 3,770,235 A | 11/1973 | Klapproth et al. | |
| 3,788,412 A | 1/1974 | Vincent | |
| 3,994,469 A | 11/1976 | Swenson et al. | |
| 4,057,214 A | 11/1977 | Harder, Jr. | |
| 4,062,585 A | 12/1977 | Herring, Jr. | |
| 4,141,429 A | 2/1979 | Hale | |
| 4,215,841 A | 8/1980 | Herring, Jr. | |
| 4,235,471 A | 11/1980 | Tengler | |
| 4,286,777 A | 9/1981 | Brown | |
| 4,291,857 A | 9/1981 | Totten et al. | |
| 4,311,204 A | 1/1982 | Shupert | |
| 4,351,556 A | 9/1982 | Worringer | |
| 4,392,546 A | 7/1983 | Brown et al. | |
| 4,429,427 A | 2/1984 | Sklar | |
| 4,477,050 A | 10/1984 | Thompson et al. | |
| 4,537,382 A | 8/1985 | Beck | |
| 4,662,597 A * | 5/1987 | Uecker | B60N 2/504 248/419 |
| 4,711,423 A | 12/1987 | Popper | |
| 4,944,554 A | 7/1990 | Gross et al. | |
| 5,367,864 A | 11/1994 | Ogasawara et al. | |
| 5,368,118 A | 11/1994 | Hoefle | |
| 5,769,492 A | 6/1998 | Jensen | |
| 5,799,475 A | 9/1998 | Borling et al. | |
| 5,873,224 A * | 2/1999 | Murakawa | A01D 34/64 56/11.4 |
| 5,915,662 A | 6/1999 | Itakura et al. | |
| 5,946,893 A | 9/1999 | Gordon | |
| 6,019,422 A | 2/2000 | Taormino et al. | |
| 6,042,093 A | 3/2000 | Garelick | |
| 6,062,333 A | 5/2000 | Gordon | |
| 6,170,242 B1 | 1/2001 | Gordon | |
| 6,244,025 B1 | 6/2001 | Ferris et al. | |
| 6,394,216 B1 | 5/2002 | Gordon | |
| 6,460,318 B1 | 10/2002 | Ferris et al. | |
| 6,510,678 B2 | 1/2003 | Ferris et al. | |
| 6,572,071 B1 | 6/2003 | Tsai | |
| 6,669,293 B2 | 12/2003 | Moore | |
| 6,688,689 B1 | 2/2004 | Thorn | |
| 6,698,172 B2 | 3/2004 | Ferris et al. | |
| 6,711,885 B2 | 3/2004 | Ferris | |
| 6,719,258 B2 | 4/2004 | Bryngelson et al. | |
| 6,857,254 B2 | 2/2005 | Melone et al. | |
| 6,866,340 B1 | 3/2005 | Robertshaw | |
| 6,988,703 B2 | 1/2006 | Ropp | |
| 7,044,553 B2 | 5/2006 | Ropp | |
| 7,107,746 B2 | 9/2006 | Melone et al. | |
| 7,152,389 B2 | 12/2006 | Melone et al. | |
| 7,374,187 B2 | 5/2008 | Melone et al. | |
| 7,882,914 B2 | 2/2011 | Scheele et al. | |
| 7,930,813 B2 | 4/2011 | Melone et al. | |
| 7,942,224 B2 | 5/2011 | Marshall et al. | |
| 7,967,282 B2 | 6/2011 | Boyd et al. | |
| 8,033,354 B2 | 10/2011 | Marshall et al. | |
| 8,065,864 B2 | 11/2011 | Melone et al. | |
| 8,146,899 B2 | 4/2012 | Hiser | |
| 8,186,475 B2 | 5/2012 | Sugden et al. | |
| 8,220,577 B2 | 7/2012 | Marshall et al. | |
| 8,245,806 B2 | 8/2012 | Newell | |
| 8,397,367 B2 | 3/2013 | Melone et al. | |
| 2001/0013217 A1* | 8/2001 | Ferris | A01D 34/64 56/15.8 |
| 2003/0024223 A1 | 2/2003 | Jager et al. | |
| 2005/0082897 A1 | 4/2005 | Ropp et al. | |
| 2005/0279910 A1 | 12/2005 | Huprikar et al. | |
| 2005/0285006 A1 | 12/2005 | Koutsky et al. | |
| 2006/0131799 A1* | 6/2006 | Carlitz | B60G 11/14 267/195 |
| 2008/0202874 A1* | 8/2008 | Scheele | A01D 34/82 188/297 |
| 2012/0049039 A1 | 3/2012 | Scheffler et al. | |
| 2013/0291508 A1 | 11/2013 | Melone et al. | |
| 2013/0291509 A1 | 11/2013 | Weber et al. | |
| 2015/0040531 A1 | 2/2015 | Melone et al. | |
| 2016/0031492 A1* | 2/2016 | Suzuki | B62D 31/00 280/788 |

FOREIGN PATENT DOCUMENTS

| | | |
|---|---|---|
| EP | 1 645 494 A2 | 4/2006 |
| GB | 774129 A | 5/1957 |
| JP | 55-69340 A | 5/1980 |
| WO | WO 2006/080495 A1 | 8/2006 |

OTHER PUBLICATIONS

"Case IH Steiger Cab Suspension." Product Listing [online]. CASE iH Agriculture, 2011 [retrieved Sep. 9, 2015]. Retrieved from the Internet: <URL:beready.caseih.com/available-land/the-new-steiger-tractor-cab-you-asked-for-it-you-got-it/attachment/steiger_cab_suspension_words_flat-2/>; 4 pages (including enlarged image from p. 1).

"5400 Series Cab Suspension." Brochure [online]. Massey Ferguson, 2010 [retrieved on Aug. 8, 2015]. Retrieved from the Internet: <URL: www.masseyferguson.us/content/dam/Brands/Massey%20Ferguson/US/Tractors/MidRange%20Tractors/5400%20Series%20Mid-Range/Literature/massey-ferguson-5400-cab-suspension-tractor-brochure-english.pdf/_jcr_content/renditions/original>; 4 pages.

"A Better Way—Rebound and Terrain Jockey." Unknown publisher. Available on or before Mar. 17, 2014, 1 page.

"Valtra N Series: HiTech/ HiTech 5/ Versu/Direct, 99-171 HP." Brochure [online]. Valtra Inc., 2013 [retrieved on Aug. 17, 2015]. Retrieved from the Internet: <URL:www.valtra.com/downloads/ValtraNSeriesEN_2013.pdf>; 48 pages.

U.S. Appl. No. 14/989,198, filed Jan. 6, 2016, Busboom et al.

"Skiroule Snowmobile—RT & RTX Series II" Owner's Manual and Maintenance Guide, Form No. 3213-9001, Skiroule Coleman. Printed in Canada circa 1973; 38 pages.

U.S. District Court, ED of Wisconsin, *Metalcraft of Mayville, Inc.* v. *The Toro Co.*; Case No. 2:16-cv-00544. Decision and Order dated Aug. 1, 2016; 13 pages.

U.S. District Court, Ed of Wisconsin, *Metalcraft of Mayville, Inc.* v. *The Toro Co.*; Case No. 2:16-cv-00544. Decision and Order dated Aug. 18, 2016; 9 pages.

\* cited by examiner

SUSPENSION SYSTEM AND RIDE-ON GROUNDS MAINTENANCE VEHICLE INCORPORATING SAME

Embodiments described herein are directed generally to ride-on grounds maintenance vehicles, and, more particularly, to suspension systems for use with such vehicles.

BACKGROUND

Riding grounds maintenance vehicles such as skid-steer loaders, fertilizer spreaders/sprayers, lawn mowers, and the like are known. During operation, undulating terrain may cause various forces to be transmitted through the chassis and, ultimately, to the riding operator. While the magnitude and duration of such forces may be minimal in some instances, traversal of rough terrain may undesirably expose the operator to numerous and/or uncomfortable movements.

Some vehicles may address this issue by providing a suspension system that attenuates these forces. While effective, such suspension systems are often complex and may not provide spring and damping characteristics that are suitable for a wide range of operators.

SUMMARY

Embodiments described herein may provide a grounds maintenance vehicle including a chassis supported upon a ground surface by ground contact members, the chassis defining a front end, a rear end, and a longitudinal axis extending between the front and rear ends. The vehicle further includes a support platform extending along the longitudinal axis. The support platform includes: a seat support portion; a foot support portion; and a connecting structure rigidly connecting the seat support portion to the foot support portion. A suspension system is also provided and includes a first suspension apparatus and a second suspension apparatus, wherein each of the first and second suspension apparatus is operatively connected to the chassis and to the support platform. The second suspension apparatus is connected to the support platform at a second longitudinal location that is at or near the connecting structure, and the first suspension apparatus is connected to the support platform at a first longitudinal location aft of the second longitudinal location.

In another embodiment, a grounds maintenance vehicle is provided that includes a chassis supported upon a ground surface by ground contact members. The chassis defines a front end, a rear end, and a longitudinal axis extending between the front and rear ends. The vehicle may further include: a support platform having a foot support portion and a seat support portion; and a suspension frame connected to the support platform, wherein the suspension frame includes a support portion and first and second branch portions. The first and second branch portions are attached to the support platform via the support portion, and the first and second branch portions are spaced-apart from one another. The vehicle also includes a suspension system connecting the chassis with the support platform. The suspension system includes a first suspension unit having a first mounting point coupled to the chassis, and a second mounting point adapted to couple at any of a plurality of user-adjustable positions formed in the first branch portion of the suspension frame. The suspension system also includes a second suspension unit having a first mounting point coupled to the chassis, and a second mounting point adapted to couple at any of a plurality of user-adjustable positions formed in the second branch portion of the suspension frame.

In still yet another embodiment, a grounds maintenance vehicle is provided that includes a chassis supported upon a ground surface by ground contact members, the chassis defining a front end, a rear end, and a longitudinal axis extending between the front and rear ends. The vehicle also includes: a support platform operatively connected to the chassis, the support platform including a foot support portion and a seat support portion; and a suspension system connecting the chassis with the support platform. The suspension system includes a first suspension unit having a first mounting point operatively coupled to the chassis, and a second mounting point operatively coupled to the support platform. The first or second mounting point of the first suspension unit is adapted to couple to the chassis or support platform, respectively, at any one of a plurality of user-adjustable positions. The suspension system also includes a second suspension unit having a first mounting point coupled to the chassis, and a second mounting point coupled to the support platform. The first or second mounting point of the second suspension unit is adapted to couple to the chassis or support platform, respectively, at any one of a plurality of user-adjustable positions.

The above summary is not intended to describe each embodiment or every implementation. Rather, a more complete understanding of illustrative embodiments will become apparent and appreciated by reference to the following Detailed Description of Exemplary Embodiments and claims in view of the accompanying figures of the drawing.

BRIEF DESCRIPTION OF THE VIEWS OF THE DRAWING

Exemplary embodiments will be further described with reference to the figures of the drawing, wherein.

Figure 1:
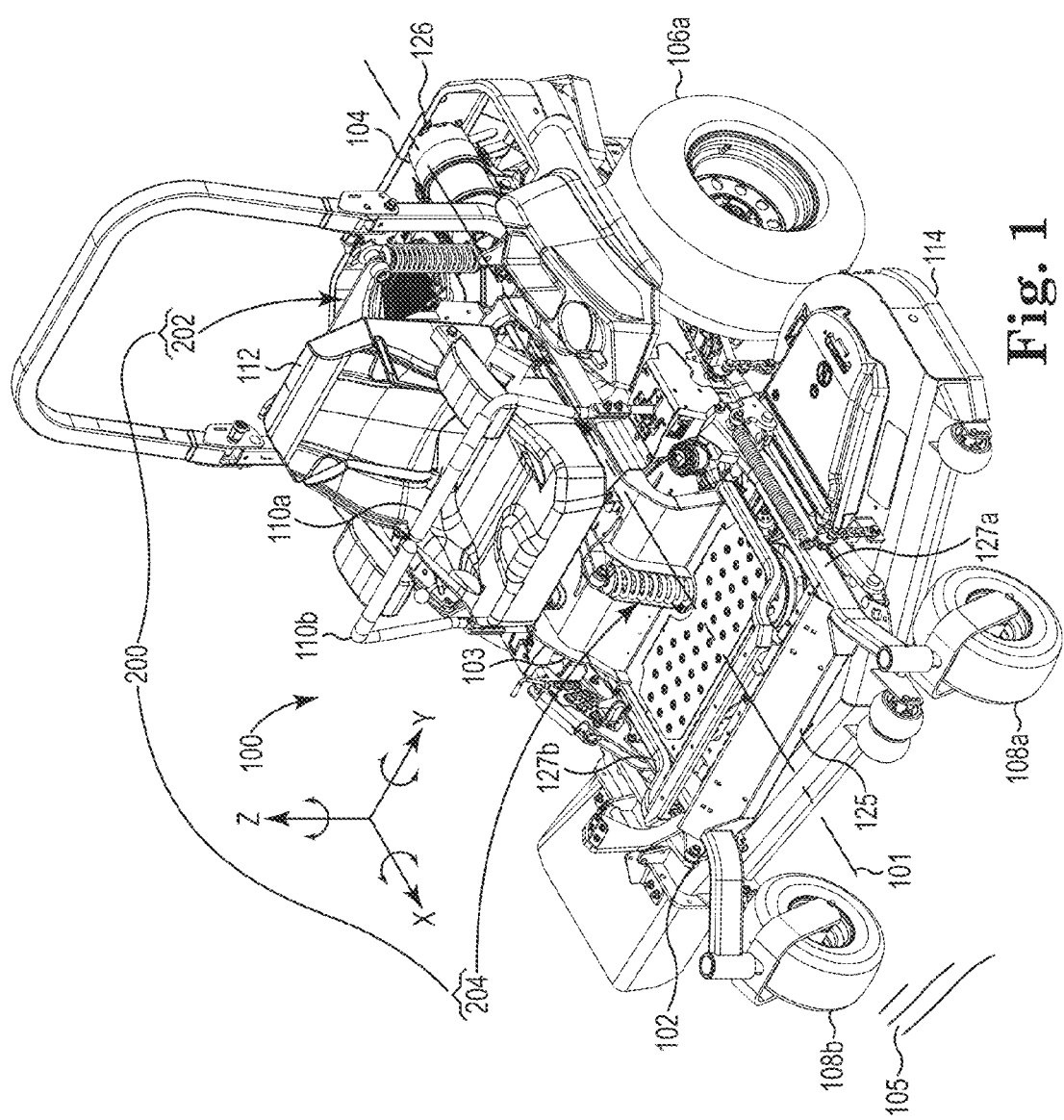
FIG. 1 is a front perspective view of a grounds maintenance vehicle, e.g., a riding turf care vehicle (e.g., lawn mower), incorporating a suspension system in accordance with one embodiment of the disclosure.

The figures are rendered primarily for clarity and, as a result, are not necessarily drawn to scale. Moreover, various structure/components, including but not limited to fasteners, electrical components (wiring, cables, etc.), and the like, may be shown diagrammatically or removed from some or all of the views to better illustrate aspects of the depicted embodiments, or where inclusion of such structure/components is not necessary to an understanding of the various exemplary embodiments described herein. The lack of illustration/description of such structure/components in a particular figure is, however, not to be interpreted as limiting the scope of the various embodiments in any way. Still further, "Figure x" and "FIG. x" may be used interchangeably herein to refer to the figure numbered "x."

DETAILED DESCRIPTION OF EXEMPLARY EMBODIMENTS

In the following detailed description of illustrative embodiments, reference is made to the accompanying figures of the drawing which form a part hereof. It is to be understood that other embodiments, which may not be specifically described and/or illustrated herein, are also contemplated.

All headings provided herein are for the convenience of the reader and should not be used to limit the meaning of any text that follows the heading, unless so specified. Moreover, unless otherwise indicated, all numbers expressing quantities, and all terms expressing direction/orientation (e.g., vertical, horizontal, parallel, perpendicular, etc.) in the specification and claims are understood as being modified by the term "about."

It is also noted that the term "comprises" and variations thereof do not have a limiting meaning where these terms appear in the accompanying description and claims. Further, "a," "an," "the," "at least one," and "one or more" are used interchangeably herein. Moreover, relative terms such as "left," "right," "front," "fore," "forward," "rear," "aft," "rearward," "top," "bottom," "side," "upper," "lower," "above," "below," "horizontal," "vertical," and the like may be used herein and, if so, are from the perspective of one operating a vehicle (e.g., a mower 100) while the vehicle is in an operating configuration, e.g., while the mower 100 is positioned such that wheels 106 and 108 rest upon a horizontal ground surface 105 as shown in FIG. 1. These terms are used only to simplify the description, however, and not to limit the interpretation of any embodiment described.

Still further, the suffixes "a" and "b" may be used throughout this description to denote various left- and right-side parts/features, respectively. However, in most pertinent respects, the parts/features denoted with "a" and "b" suffixes are substantially identical to, or mirror images of, one another. It is understood that, unless otherwise noted, the description of an individual part/feature (e.g., part/feature identified with an "a" suffix) also applies to the opposing part/feature (e.g., part/feature identified with a "b" suffix). Similarly, the description of a part/feature identified with no suffix may apply, unless noted otherwise, to both the corresponding left and right part/feature.

Generally speaking, embodiments of the present disclosure are directed to a ride-on grounds maintenance vehicle that includes a chassis supported upon a ground surface by one or more ground contact members. The vehicle may include an operator support platform to support a riding operator during vehicle operation. Operatively connecting the chassis to the support platform is a suspension system. The suspension system may attenuate forces, e.g., travel-induced forces, which may otherwise be transmitted to the support platform during vehicle operation. Stated another way, the support platform, and thus the operator, may be partially isolated from forces imparted to the chassis as a result of vehicle operation. Moreover, in some embodiments, the suspension system may permit spring and/or damping adjustment of the suspension system to, for example, better accommodate a range of operator riding preferences.

FIG. 1 illustrates an exemplary grounds maintenance vehicle 100 including a suspension system 200 in accordance with one embodiment of the disclosure. As stated above, the suspension system 200 may operatively connect a chassis 102 of the vehicle with an operator support platform 103. As a result, the support platform 103 may "float" relative to the chassis 102 via compliance of the suspension system 200. That is, the suspension system 200 may allow for relative motion between the support platform 103 and the chassis 102. Again, by selecting the particular characteristics of the suspension system 200, forces that would otherwise be transmitted to the operator during mower operation may be effectively reduced.

While the vehicle is shown and described herein as a self-propelled riding or ride-on lawn mower (also referred to herein simply as a "mower" or "vehicle"), such a configuration is not limiting. That is, while embodiments are described herein with respect to a ride-on mower, those of skill in the art will realize that embodiments of the present disclosure may find applicability to other types of ride-on (e.g., sit-on or stand-on) turf care or grounds maintenance vehicles/equipment including skid-steer vehicles, aerators, material spreader/sprayers, dethatchers, snow throwers, and debris management systems, to name a few.

While the general construction of the vehicle is not necessarily central to an understanding of exemplary embodiments, an illustrative mower 100 is briefly described below. The mower 100/chassis 102 may define front and rear ends 125, 126, respectively, with a longitudinal or travel axis 101 extending between the front and rear ends (i.e., the longitudinal axis is the axis of mower travel when the mower is traveling in a straight line). The mower 100/chassis 102 may further define left and right sides 127a, 127b, respectively. As used herein, a transverse axis or plane is any axis or plane normal to the longitudinal axis 101 (e.g., such a transverse axis or plane would intersect the left and right sides 127a, 127b of the chassis 102).

The chassis 102 may support a prime mover (e.g., internal combustion engine) 104, which may, in one embodiment, be located at or near the rear end 126 of the mower 100 as indicated in FIG. 1. Left and right ground-engaging drive members (e.g., rear drive wheels 106a, 106b (see also FIG. 2)) may be rotatably coupled to left and right sides 127a, 127b, respectively, of the chassis 102. Each drive wheel may be powered to rotate, relative to the chassis 102, about a fixed axis such that simultaneous and equal rotation of the two drive wheels causes the mower 100 to move parallel to (i.e., along) the longitudinal axis 101. In one embodiment, the mower 100 may be configured as a zero-turn-radius (ZTR) vehicle, wherein the drive wheels 106 are independently driven by the engine 104 (e.g., via one or more hydraulic motors/pumps, hydrostatic transmissions, or the equivalent). While described herein as an internal combustion engine 104, other embodiments could utilize other prime movers, e.g., an electrical power source to power the drive wheels 106. Moreover, while illustrated as wheels 106, other embodiments may utilize other drive members (e.g., tracks or the like) without departing from the scope of this disclosure.

The mower 100 may additionally include one or more, e.g., two, support wheels 108a, 108b. In the illustrated embodiment, the support wheels 108 are caster wheels and are located forward of the drive wheels 106 (e.g., during normal forward travel of the mower) and are thus referred to herein as "front" wheels (however, such a configuration is not limiting as, for example, the positions of the drive wheels and the support wheels could be reversed). Accordingly, the rear drive wheels 106 may support a rear portion of the mower 100 in rolling engagement with the ground surface 105, while the front wheel(s) 108 may likewise support a front portion of the mower 100. Once again, while described herein as utilizing two rear drive wheels and two front castering wheels, such a configuration is merely exemplary. For example, other embodiments may use more or less wheels (e.g., a tri-wheel configuration), while still other embodiments may provide different drive wheel configurations (e.g., front-wheel drive or all-wheel drive) or different steering configurations (e.g., a vehicle with conventional Ackermann-type steering).

The mower 100 may further include one or more controls, e.g., left and right drive control levers 110a, 110b. The drive control levers 110 may be pivotally coupled to the mower 100 (e.g., to the chassis 102) such that the levers may independently pivot forwardly and rearwardly (e.g., about a transverse axis) under the control of an operator located at an operator station that, in one embodiment, is configured as an operator seat 112. Via incremental pivoting, the drive control levers 110 are operable to control the speed and direction of their respective drive wheels 106 (e.g., the left lever 110a may control speed and rotational direction of the left drive wheel 106a, while the right lever 110b may control speed and rotational direction of the right drive wheel 106b) via manipulation of the mower's drive system. While illustrated herein as incorporating separate drive control levers 110, other controls, e.g., single or multiple joysticks or joystick-type levers, touchpads, steering wheels, foot pedals, etc. could also be used to control one or both of mower speed and direction.

A lawn mower cutting deck 114 may be mounted to the lower side of the chassis 102, e.g., generally between the rear drive wheels 106 and the front wheels 108. The cutting deck 114 may include a housing forming a cutting chamber. The cutting chamber may partially surround one or more rotatable cutting blades (not shown) as is known in the art. While shown as a mid- or belly-mount deck, other embodiments may position the deck in other locations, e.g., forward of the front wheels 108, aft of the rear wheels 106, lateral to the chassis 102, etc.

During operation, power is selectively delivered (by the prime mover 104) to the cutting deck 114 and the drive wheels 106, whereby the cutting blades rotate at a speed sufficient to sever grass and other vegetation as the deck passes over the ground surface 105. Typically, the cutting deck 114 has an operator-selectable height-of-cut system to allow deck height adjustment relative to the ground surface 105.

As illustrated in the figures, a suspension system, e.g., suspension system 200, may be operatively connected between the chassis 102 and the support platform 103. In one embodiment, the suspension system 200 includes a first suspension apparatus 202 (see, e.g., FIG. 2) and, optionally, a second suspension apparatus 204 (see, e.g., FIG. 1). As stated elsewhere herein, the suspension system 200 is provided to attenuate and dampen forces that would otherwise be transmitted through the chassis 102 to the support platform 103 (and thus to the seat 112).

Figure 2:
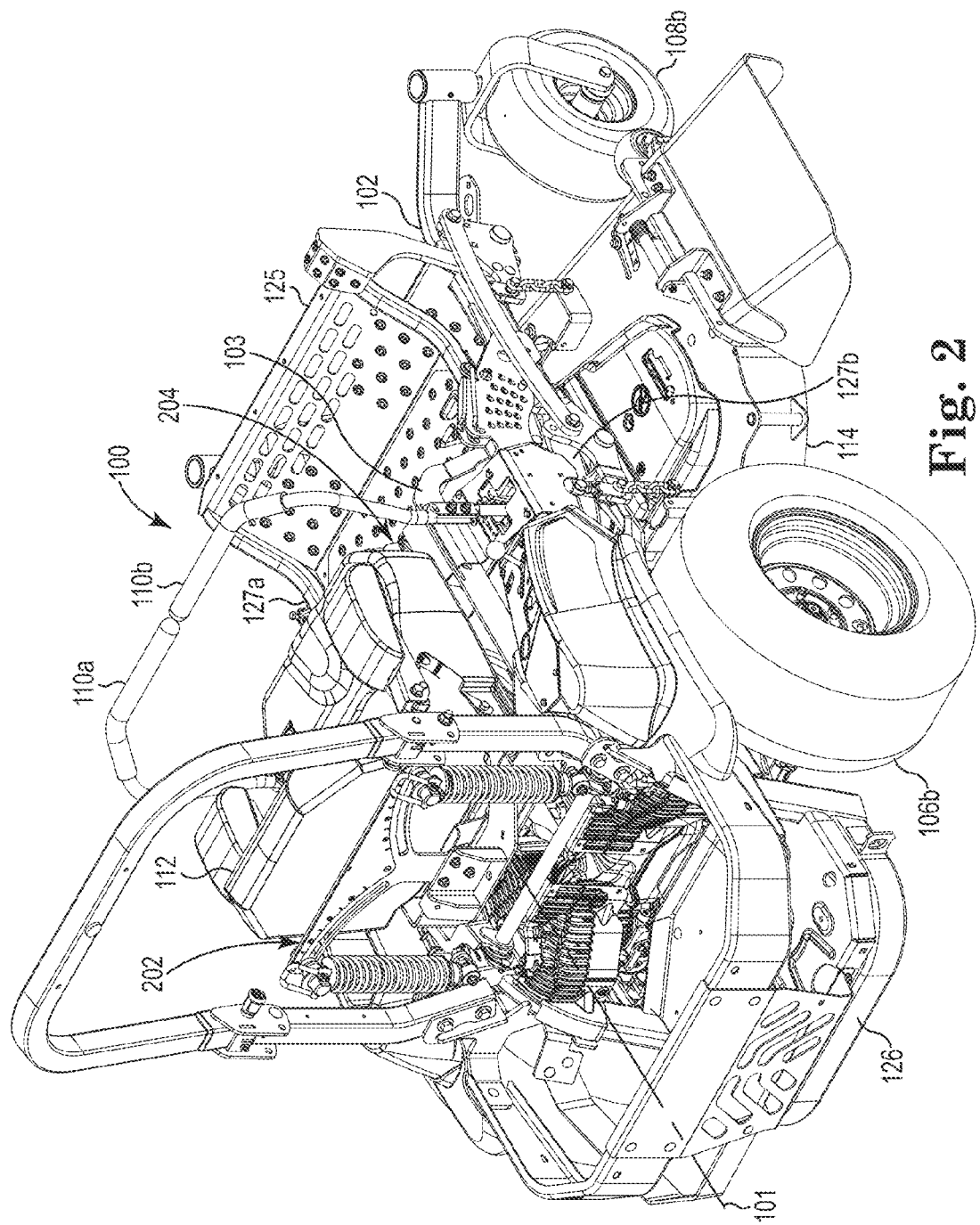
FIG. 2 is a rear perspective view of the lawn mower of FIG. 1 with some structure (e.g., prime mover) removed to better illustrate aspects of the exemplary suspension system.

As shown in FIGS. 1 and 2, the first suspension apparatus 202 may be longitudinally positioned (i.e., positioned along the longitudinal axis 101) at or near a rear end of the support platform, e.g., at a location between the rear end 126 of the chassis and the second suspension apparatus 204. Moreover, the second suspension apparatus 204 may be located more toward an intermediate or central portion of the support platform 103. While such placement may locate the suspension apparatus 202, 204 near a center of the unsprung mass of the support platform 103, other suspension apparatus locations are also contemplated. For instance, the first suspension apparatus 202 may be located forward of the seat portion, with the second suspension apparatus 204 located either aft or forward of the first suspension apparatus.

As shown in FIG. 1, the seat 112 may be positioned at most any location on the vehicle including, for example, near the front or rear ends 125, 126 and/or near the left or right sides 127a, 127b of the chassis 102. In the illustrated embodiment, however, the seat 112 is generally centered between the left and right sides 127a, 127b of the chassis 102 and somewhat closer to the rear end 126 than to the front end 125.

The mower 100 may also include one or more isolators 116 (see FIG. 3) operatively located between the seat 112 and the support platform 103. The isolator(s) 116 may include elastomeric elements that absorb multidirectional forces resulting from motor and/or mower operation. Once again, while shown as a seat 112, operator stations adapted to support a standing operator are also within the scope of this disclosure.

Figure 3:
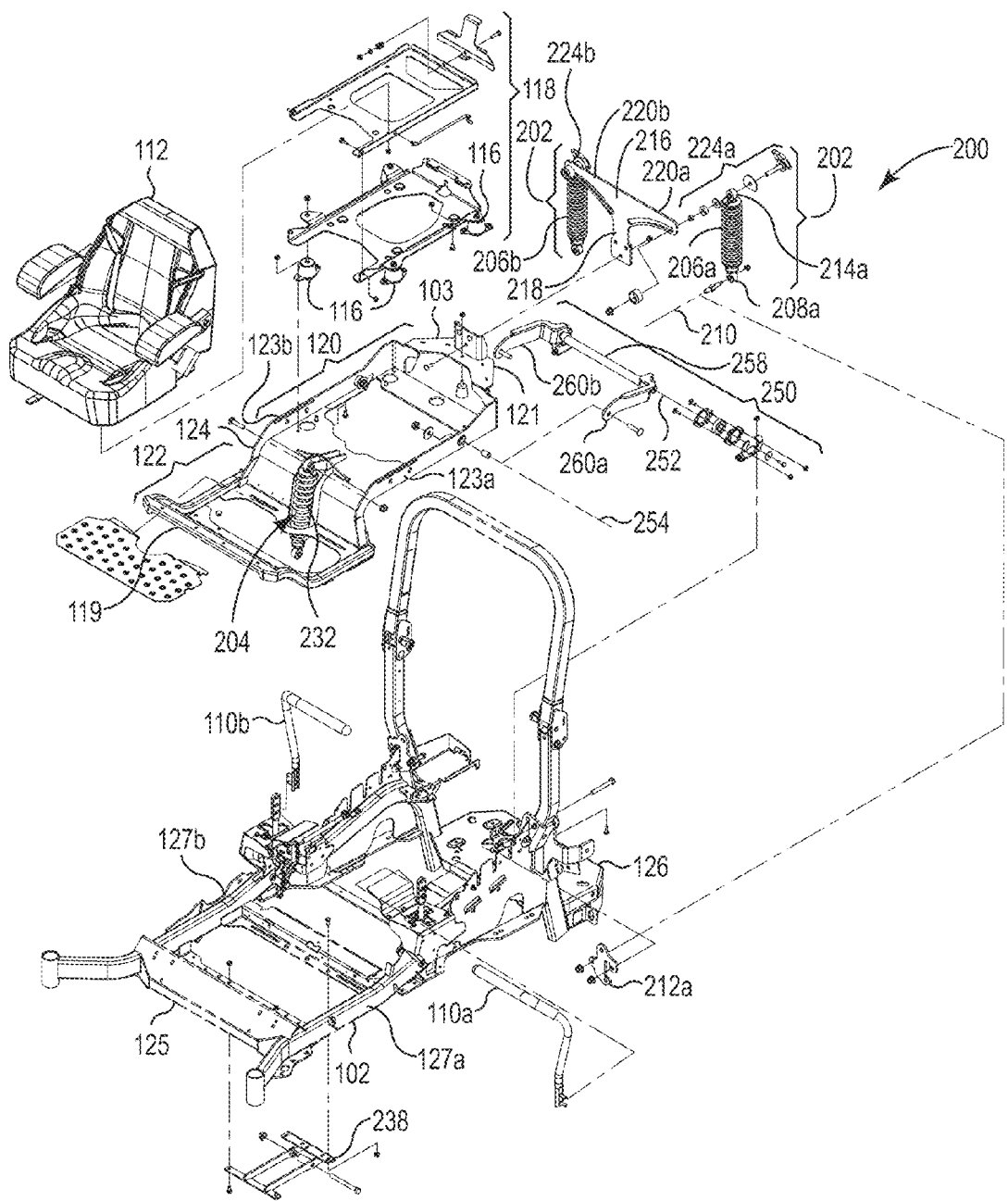
FIG. 3 is a partial exploded view of the mower of FIGS. 1-2 illustrating the exemplary suspension system, the suspension system operatively connecting an operator support platform with a chassis of the mower.

FIG. 3 is an exploded view of various components of the exemplary mower 100. As shown in this view, the seat 112 may, via an intermediate seat attachment structure 118, connect to the support platform 103 via the isolators 116. As is evident in the figures, the support platform 103 may, in one embodiment, be (at least in some positions) located above the chassis 102 and extend over a substantial length and width of the chassis. For example, the support platform 103 may, as indicated in FIG. 1, extend over most of the chassis 102 (except for the area near the engine 104 proximate the rear end 126 of the chassis 102). While extending over a substantial portion of the chassis 102, the support platform 103 may, in the illustrated embodiment, still be contained within an envelope defined by the front and rear ends 125, 126 and left and right sides 127a, 127b. In yet other embodiments, the support platform 103 may be smaller or, alternatively, larger than the chassis 102 (e.g., the support platform could extend beyond one or more of the front and rear ends 125, 126 and the left and right sides 127a, 127b). In still other embodiments, the support platform 103 may be at the same elevation as (or be below the elevation of) the chassis 102 during some or all of its travel range.

In the illustrated embodiment, the support platform 103 has a long dimension oriented fore-and-aft along the longitudinal axis 101, e.g., the support platform extends along the longitudinal axis. In addition to a seat support portion 120 to which the seat 112 may couple, the support platform 103 may further define a foot support portion 122, and a connecting structure 124, the latter rigidly connecting the seat support portion to the foot support portion. Like the chassis 102, the support platform 103 may also define front and rear ends 119, 121, respectively, and outermost left and right sides 123a, 123b, respectively. As shown in FIG. 2, the seat support portion 120 may be closer to the rear end 121 than to the front end 119 of the platform 103, while the foot support portion 122 may be situated closer to the front end 119 than to the rear end 121.

The connecting structure 124 may be a separate component of the platform 103 or, alternatively, part of one or both of the seat support portion 120 and the foot support portion 122. In general, the connecting structure 124 may be of most any configuration that adequately and rigidly connects the seat support portion 120 to the foot support portion 122 of the support platform 103. For instance, in the illustrated embodiment, the foot support portion 122 is vertically spaced-apart from (e.g., below) the seat support portion 120 and, in at least one embodiment, the foot support portion 122 and the seat support portion 120 are in generally parallel planes. As a result, the connecting structure 124 may be oriented in a direction that is generally vertical, or at a slight incline from vertical. Regardless of its exact orientation, the connecting structure 124 may extend from a forward end of the seat support portion 120 downwardly to a rearward end of the foot support portion 122. As will be described in more detail below, the connecting structure 124 and/or the seat support portion 120 and the foot support portion 124 may incorporate features to accommodate the second suspension apparatus 204. While, in the illustrated embodiment, the support platform 103 is shown as a unitary welded structure, those of skill in the art will realize that the support platform 103 could also be an assembly of multiple components that are rigidly connected (e.g., bolted, welded, clamped, pinned, etc.), or otherwise attached to one another, to form the support platform.

Although shown as being vertically spaced-apart, the seat support portion 120 and the foot support portion 122 may, in other embodiments, both be on the same plane (i.e., forming a generally flat support platform 103). In such a configuration, the connecting structure 124 is understood to be an intermediate portion of the support platform 103 that lies between the seat support portion 120 and the foot support portion 122.

With this brief introduction of an exemplary vehicle construction, embodiments of the suspension system 200 are now described. In the illustrated embodiments, the suspension system may include the first suspension apparatus 202 and the second suspension apparatus 204, each of which operatively connect to both the chassis 102 and to the support platform 103. The first suspension apparatus 202 is now described primarily with reference to FIGS. 3, 4, 5, and 6.

For purposes of this description, potential degrees of freedom of the platform 103/seat 112, relative to the chassis 102, may be described as occurring in relation to three mutually perpendicular axes as shown in FIG. 1: the longitudinal or fore-and-aft axis x; the transverse or side-to-side axis y; and the vertical axis z. In addition to potential translation along each of these three axes, the platform 103/seat 112 may also potentially pivot, relative to the chassis 102, about the x (e.g., "roll"), y (e.g., "pitch"), and z (e.g., "yaw") axes.

In one embodiment, the first suspension apparatus 202 may include one or more, e.g., two, suspension units 206 (e.g., 206a, 206b). Each suspension unit 206 may include a compression spring that resists compressive loads, and a damper configured to slow both: the spring's compression; and its extension ("rebound") after the compressive load is released. Accordingly, each of the suspension units 206 may be constructed in a manner similar to that of a conventional coil over linear shock absorber. In other embodiments, the spring may be separated from the damper without departing from the scope of this disclosure.

Each of the suspension units 206 may also include a first mounting point 208 (208a, 208b) adapted to couple to the chassis 102 such that the suspension unit 206 may pivot about a pivot axis 210 (210a, 210b), which, in the illustrated embodiment, is parallel to the longitudinal axis 101 (see FIG. 1). A bracket 212 (212a, 212b) integrally formed with, or otherwise attached to, the chassis 102 may be used to form the first mounting point 208.

Figure 4:
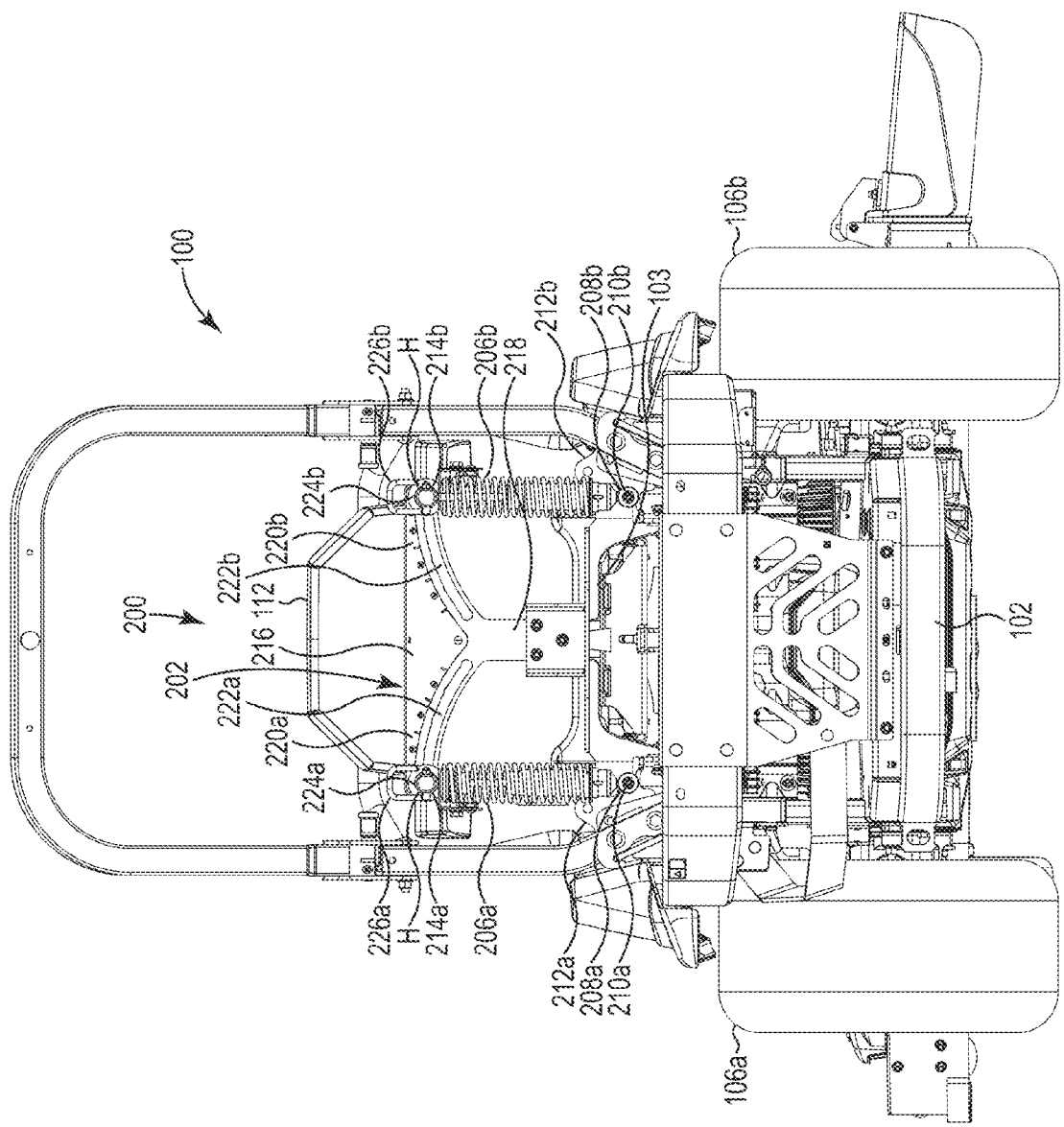
FIG. 4 is a rear view of the mower of FIG. 2 illustrating a first (e.g., rear) suspension apparatus in accordance with one embodiment of the suspension system, the first suspension apparatus shown in a first configuration adapted to provide the suspension system with a first stiffness and damping rate.
Figure 5:
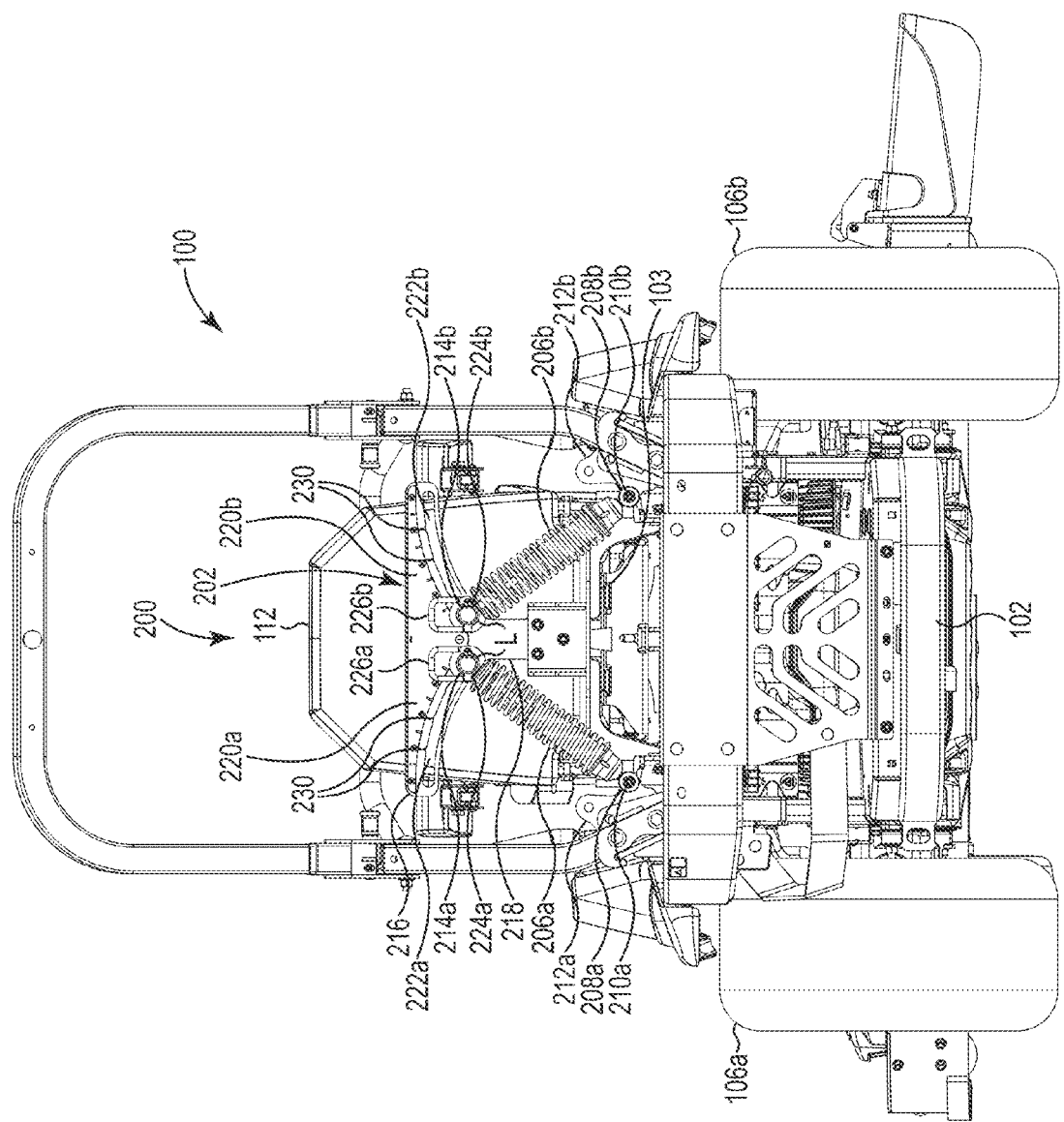
FIG. 5 is a rear view similar to FIG. 4, but with the first suspension apparatus shown in a second configuration adapted to provide the suspension system with a second stiffness and damping rate.

Each suspension unit 206 may also include a second mounting point 214 (214a, 214b) at an end opposite the first mounting point 208, wherein the second mounting point is adapted to couple to the support platform 103. To accommodate the second mounting point 214, a suspension frame 216 may be connected to, or formed integrally with, the support platform 103. The suspension frame 216 may, in one embodiment, include a support portion 218 and spaced-apart first and second branch portions 220a, 220b, effectively forming a T-shaped tower as shown in FIGS. 3-5. When configured in this manner, the support portion 218 may include a first (e.g., lower) end attached (e.g., bolted) to the support platform 103 as shown. The branch portions 220 may then extend laterally outward from a second (e.g., upper) end of the support portion 218. As illustrated, the branch portions 220a and 220b may extend outwardly in opposite directions (e.g., left and right directions, respectively) from one another. In other embodiments, the branch portions 220 could each independently connect to the support platform 103 (i.e., each branch portion could form a separate component that connects to the support platform independently of the other branch portion such that no common support portion is present).

With reference to FIGS. 4 and 5, each branch portion 220 of the suspension frame 216 may include an arcuately shaped slot 222 (222a, 222b). Both slots (as well as both suspension units 206) may generally lie within a common, transverse vertical plane and be laterally offset from one another. Each slot 222 may extend along a radius having its center at the associated pivot axis 210 (e.g., the slot 222a is defined by the pivot axis 210a, while the slot 222b is defined by the pivot axis 210b). As a result, each second mounting point 214 may be positioned at any one of a plurality of user-adjustable positions within the slot 222 of its respective branch 220 of the suspension frame 216. Two different positions of the second mounting points 214 are illustrated in FIGS. 4 and 5. FIG. 4 illustrates the second mounting points 214 at a position along the slot 222 that orients the suspension units 206 (e.g., of the first suspension apparatus 202) to provide a first or highest stiffness setting H. In this configuration, the suspension system 200 provides a vertical spring/damping rate better suited to operators who prefer a stiffer (firmer) ride. FIG. 5, on the other hand, illustrates the second mounting points 214 at a position along the slots 222 that orients the suspension units 206 to provide a second or lowest stiffness setting L. In this configuration, the suspension system 200 provides a vertical spring/damping rate better suited to operators who prefer a softer or more compliant ride. Of course, the second mounting points could be located at any intermediate position along the slots 222 to provide a plurality of settings between the highest stiffness setting H and the lowest stiffness setting L.

While shown as using an arcuate slot 222, other embodiments may instead utilize a plurality of discrete apertures to which the second mounting point 214 may be attached. Moreover, while shown as incorporating adjustability of the second mounting point 214, such a configuration is not limiting. For example, the second mounting point could be at a fixed location and the first mounting point 208 could be movable to different locations on the chassis 102 to provide the desired adjustability.

Each of the second mounting points 214 of the first and second suspension units 206a, 206b may include a retention member 224 (22a, 224b). Each retention member may be reconfigurable between a loosened configuration and a tightened configuration. In the loosened configuration, the second mounting point 214 is adapted to slide along the corresponding slot 222 of its respective branch portion 220. In the tightened configuration, each second mounting point 214 may be immobilized relative to its corresponding slot 222.

Figure 6:
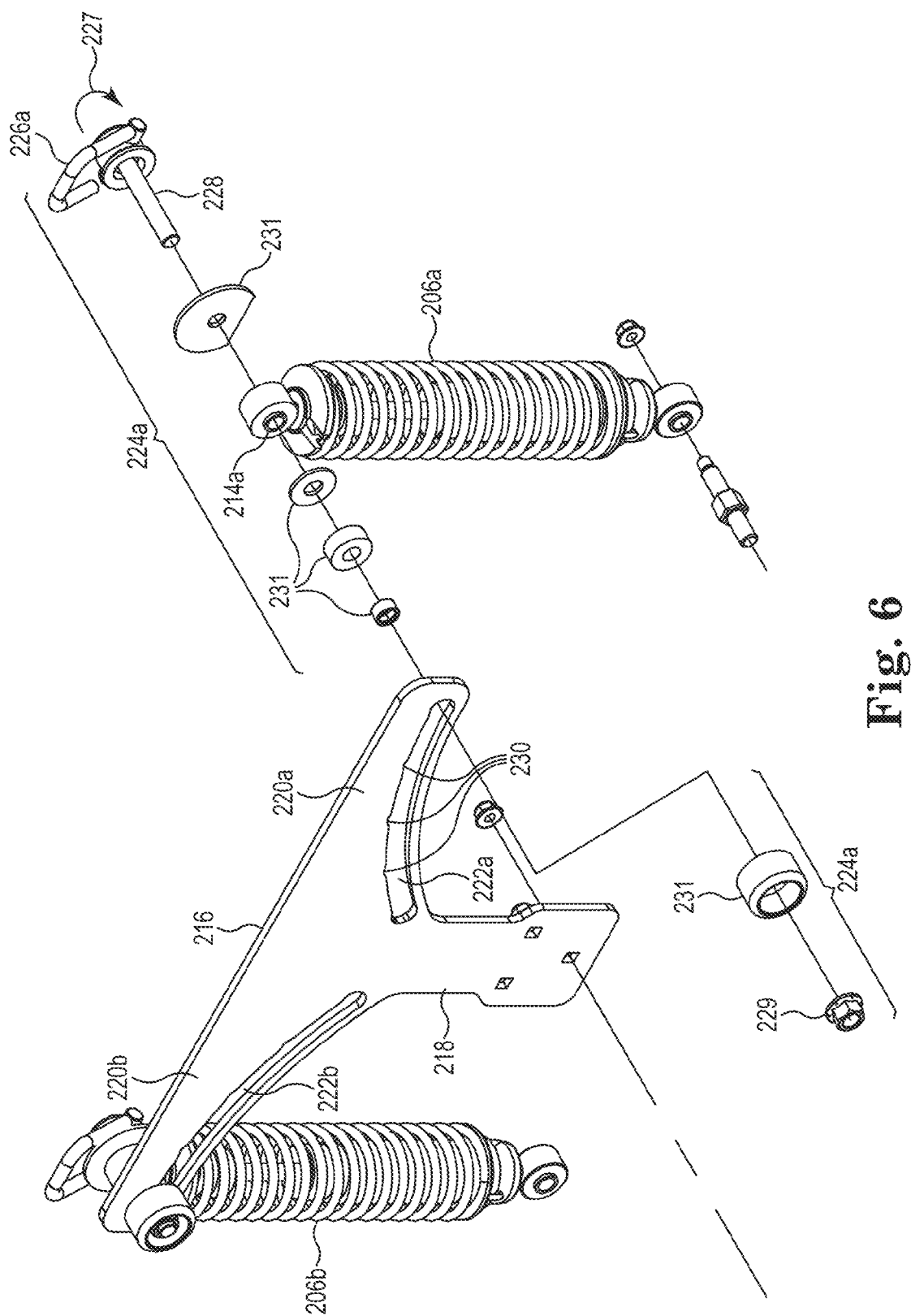
FIG. 6 is an exploded view of a portion of the first suspension apparatus.

The retention member 224 is shown in more detail in FIG. 6. While not wishing to be bound to any specific embodiment, each retention member 224 may include a handle 226 (226a, 226b) that may be rotated (e.g., without tools) to manipulate the retention member between the loosened and tightened configurations. The handle 226 may receive or include a threaded rod 228 that passes through the slot 222 on the suspension frame 216 and threadably engages a receiving nut 229 on the opposite side of the suspension frame. The handle 226 may be pivoted, e.g., moved in a direction 227 (see also FIG. 9). As this movement occurs, a cam (not illustrated) may permit a clamp surface of the handle 226 to move away from the receiving nut, thereby reducing the clamp load applied by the retention member 224 to the suspension frame 216. As a result, the second mounting point 214 may move along the slot 222 to a new position (e.g., the loosened configuration). Conversely, moving the handle 226 back to the position shown in FIGS. 6 and 9 (e.g. in a direction opposite that of direction 227) causes the cam of the retention member 224 to again clamp the second mounting point 214 relative to the suspension frame 216, thereby securing the second mounting point relative to the slot (e.g., the tightened configuration). As illustrated in FIG. 6, the retention members 224 may include other hardware 231 (e.g., washers, spacers, etc.) as needed to permit desired operation.

Of course, the handle 226 is illustrative and other retention member configurations (e.g., other clamps, fasteners, clips, dowels, screws, and the like) are certainly possible. For instance, in embodiments wherein the slot 222 is replaced with discrete apertures as mentioned elsewhere herein, each retention member may be configured as a removable nut and bolt combination that permits the desired movement of the second mounting point 214.

To assist the operator with locating the second mounting points 214 of each suspension unit 206 at equivalent positions along their respective slots 222, the slots may be formed with position indicators. For example, each slot 222 could include detents 230 that momentarily catch the second mounting point 214 as it slides along the slot 222. In addition or alternatively, each slot 222 may include visual indicia (e.g., numerical indicia) that may assist the operator in ensuring that both of the suspension units 206 are set at the same angular orientation. Of course, it is possible that each suspension unit 206 could be located at a different angular position along its respective slot 222, thereby allowing yet even more spring/stiffness settings.

As one of skill may appreciate, the suspension units 206 may each provide different vertical reaction force vectors depending on where along the branch portion (e.g., where along the slot 222) the respective second mounting point 214 is located. As a result, each operator may "tune" the suspension system 200 to provide the most suitable suspension characteristics based upon his or her weight and/or comfort level.

Figure 7:
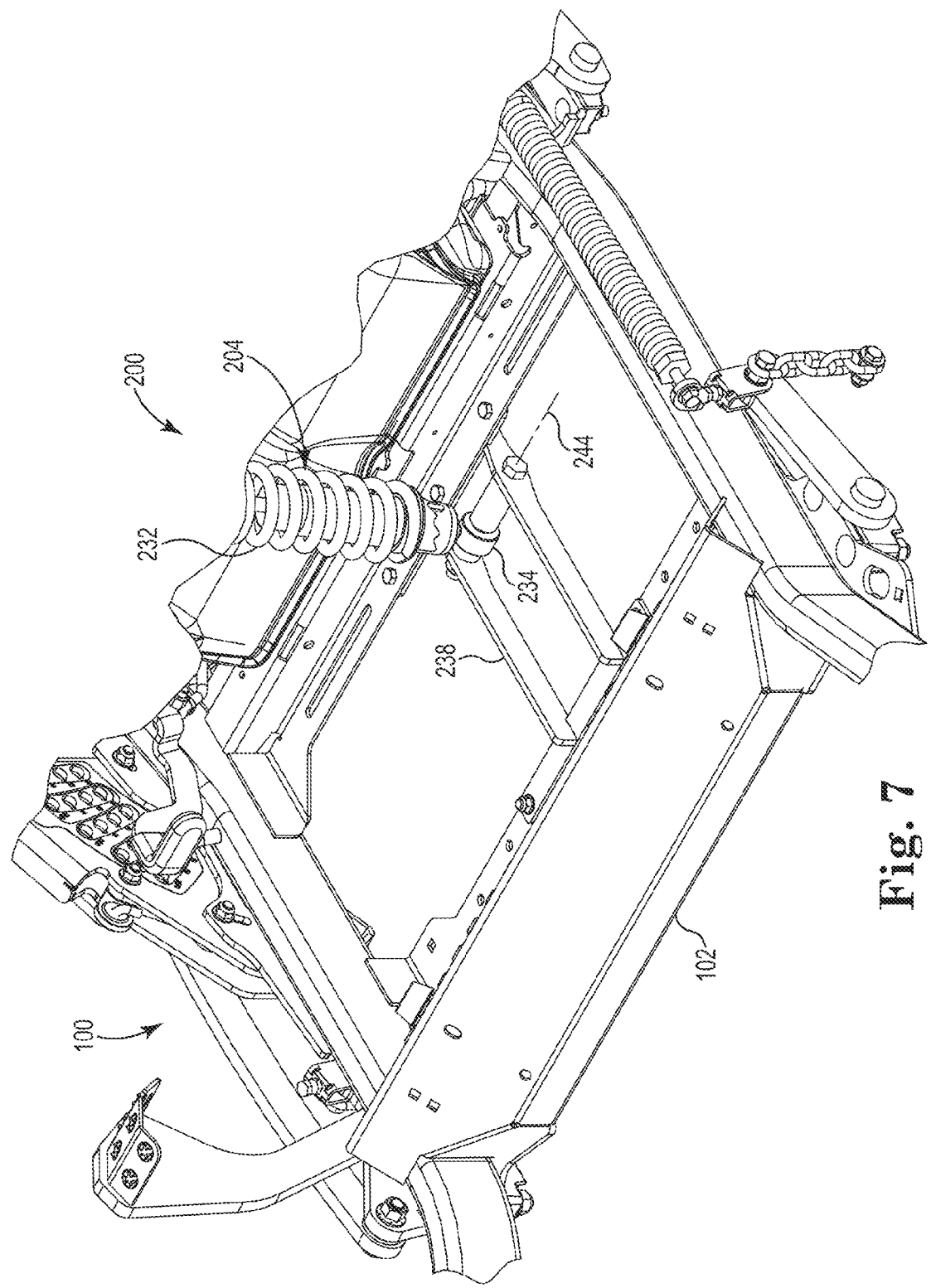
FIG. 7 is a perspective view of a first or chassis mounting point of a second (e.g., front) suspension apparatus in accordance with one embodiment of the suspension system.
Figure 8:
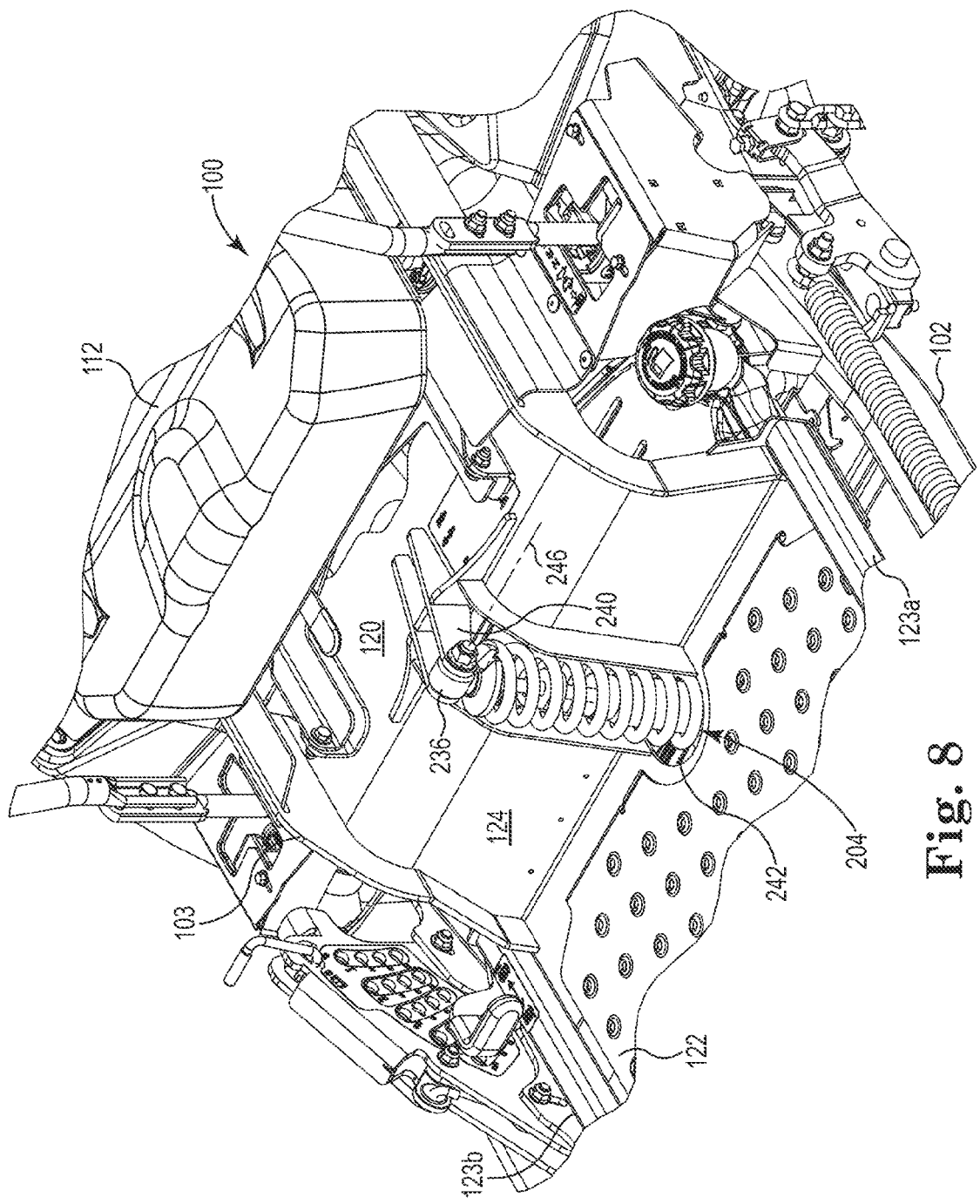
FIG. 8 is a perspective view of a second or platform mounting point of the second suspension apparatus of FIG. 7.

With reference now to FIGS. 3, 7, and 8 the optional second or forward suspension apparatus 204, which is also operatively connected between the chassis 102 and the support frame 103, is now described. As stated elsewhere herein, the second suspension apparatus 204 may connect to the support platform at a longitudinal location forward of a longitudinal location at which the first suspension apparatus 202 (e.g., the first and second suspension units 206) connects. In one embodiment, second suspension apparatus 204 connects near the junction of the seat support portion 120 and the foot support portion 122 of the support platform 103 (e.g., at or near the connecting structure 124 (see FIG. 8)). As shown in FIG. 7, the second suspension apparatus 204 may include a suspension unit 232 (also referred to as a front suspension unit) constructed in a similar manner to the suspension units 206 already described (i.e., the suspension unit 232 may form a conventional coil over linear shock absorber). Of course, the suspension unit 232, as well as the units 206, could be configured in most any way that provides the desired shock absorbing/damping characteristics, e.g., with spring elements, elastomeric elements, pneumatic or hydraulic elements, etc.

Like the suspension units 206, the suspension unit 232 may include a first mounting point 234 (see FIG. 7) and a second mounting point 236 (see FIG. 8). The first mounting point 234 of the suspension unit 232 may be connected to the chassis 102 at a first longitudinal location, while the second mounting point 236 may be connected to the support platform 103 at a second longitudinal location. As shown in FIG. 7, the first longitudinal location may be formed by a bracket 238 attached (e.g., via bolts) to, or integral with, the chassis 102. Similarly, the second mounting point 236 of the suspension unit 232 may couple to a bracket 240 attached to, or integral with, the support platform 103. In the illustrated embodiment of FIG. 8, the bracket 240 is welded to the seat support portion 120, and extends forwardly as shown. In some embodiments, the first and second longitudinal locations (of the first and second mounting points 234, 236) may be identical (i.e., the suspension unit 232 may be vertical). In other embodiments (e.g., like the embodiments shown herein), the first longitudinal location may be closer to the front end of the chassis 103 than the second longitudinal location (or, alternatively, vice-versa).

The support platform may include features to accommodate the second suspension apparatus 204 (e.g., accommodate the suspension unit 232). For example, portions of the seat support portion 120, the foot support portion 122, and/or the connecting structure 124 may define an aperture 242 through which the suspension unit 232 may pass. While illustrated herein as being embodied as a single suspension unit 232, the second suspension apparatus 204 could, in some embodiments, include two or more suspension units without departing from the scope of this disclosure. Moreover, the second suspension apparatus 204 may be positioned anywhere on the support platform 103, e.g., anywhere along the longitudinal axis 101 that is spaced-apart from the first suspension apparatus 202. Further, although shown as being positioned equidistant from the left and right sides 123a, 123b (see FIGS. 3 and 8) of the support platform 103 (i.e., being centered), such a configuration is not limiting as the second suspension apparatus 204 could, in other embodiments, be located off-center.

The first and second mounting points 234, 236 of the suspension unit 232 are, in one embodiment, adapted to pivot at their respective attachment points, e.g., the first mounting point 234 is adapted to pivot about a transverse axis 244 (see FIG. 7), while the second mounting point 236 is adapted to pivot about a transverse axis 246 (see FIG. 8). As a result, the second suspension apparatus 204 may allow for some longitudinal displacement of the support platform 103 relative to the chassis 102.

Figure 9:
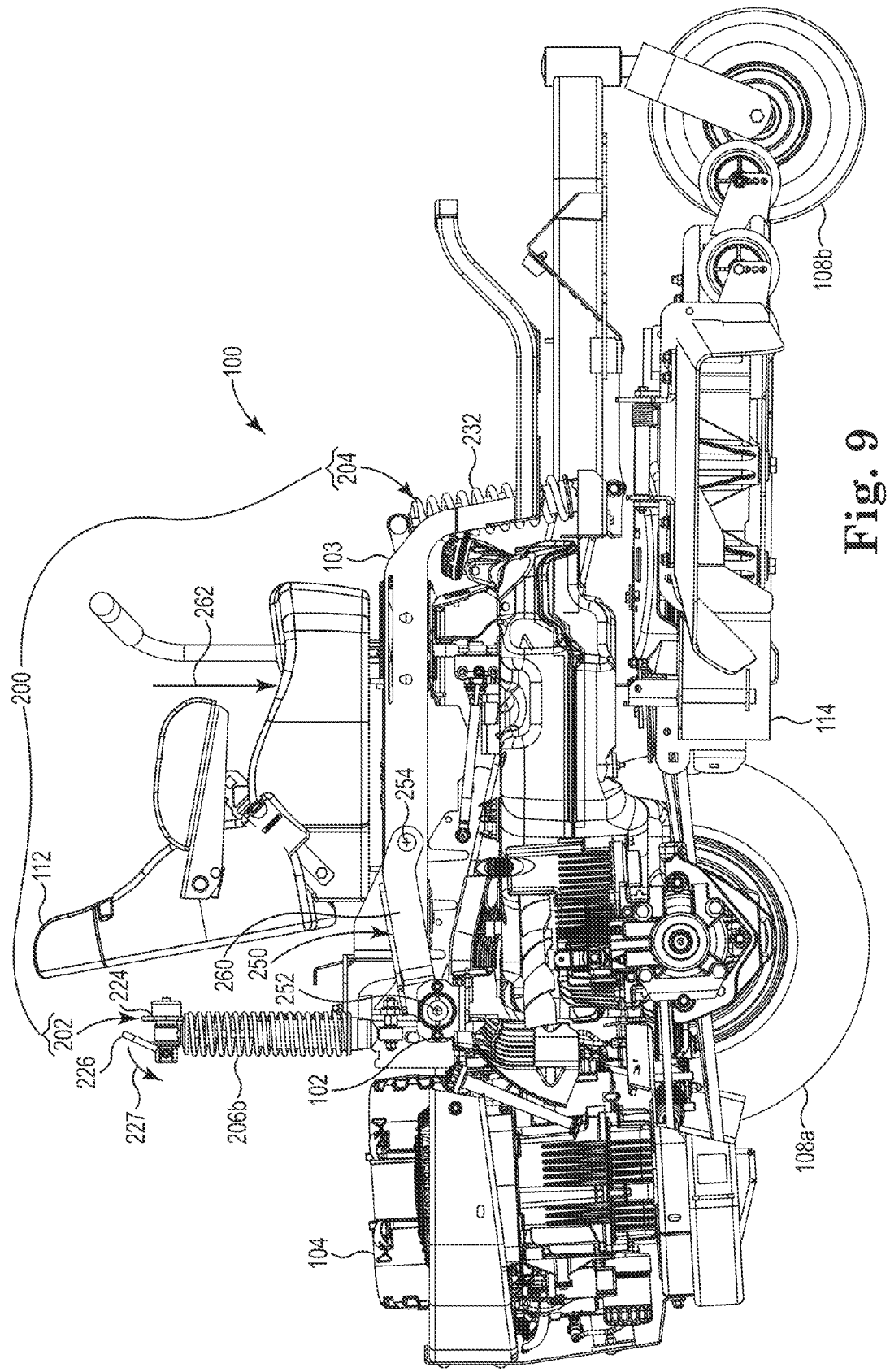
FIG. 9 is a side section view of the mower of FIG. 1, wherein the suspension system is illustrated in a first, undeflected position.
Figure 10:
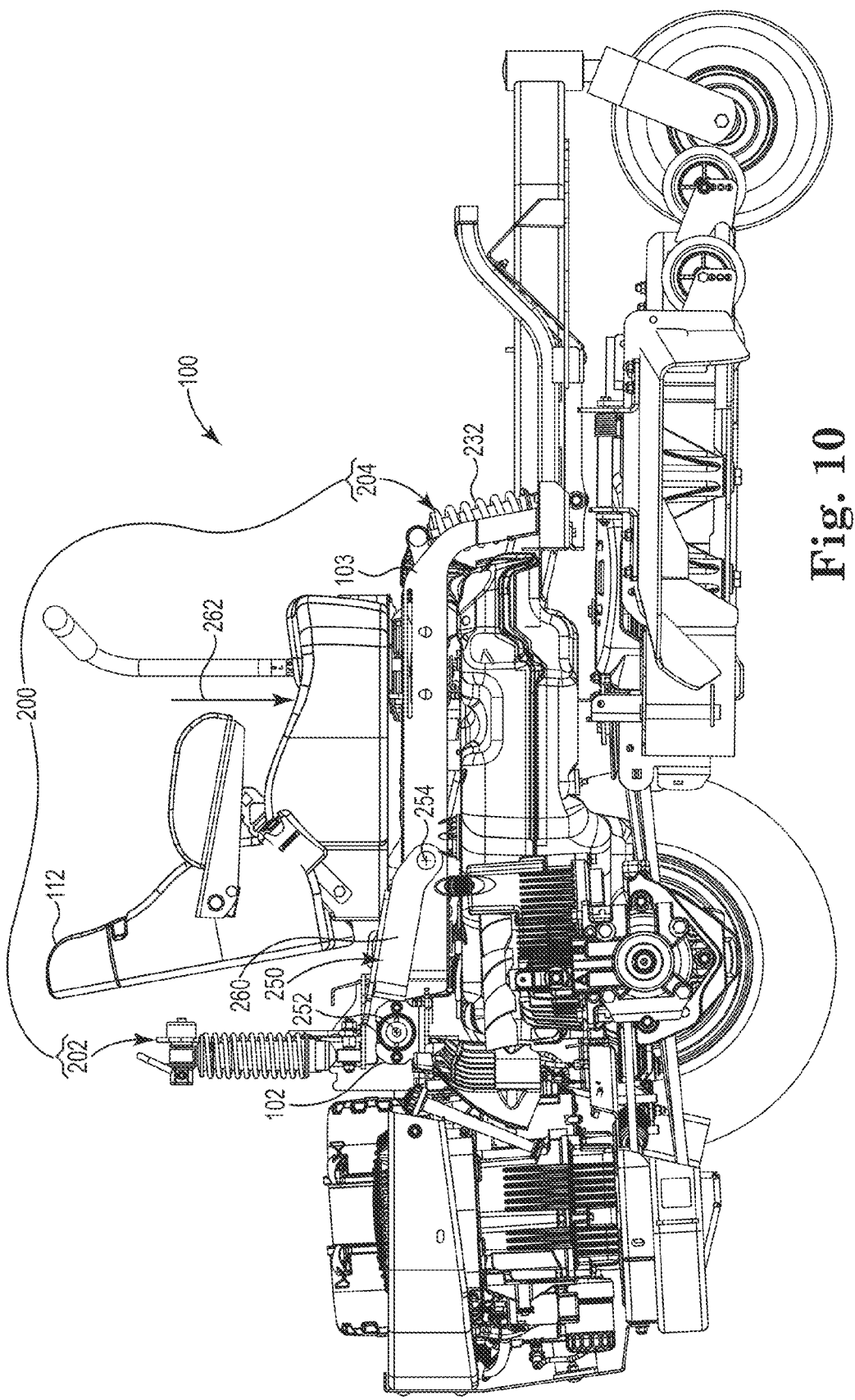
FIG. 10 is a side section view similar to FIG. 9, but with the suspension system illustrated in a second, deflected position.

With reference now to FIGS. 3, 9, and 10, the exemplary suspension system 200 may further include a pivot member 250. The pivot member 250 may assist in reducing or even eliminating fore-and-aft and transverse (side-to-side) translation, as well as rolling and yawing, of the support platform 103 relative to the chassis 102. In other words, the pivot member 250 may be configured to allow or permit the support platform 103 to move generally up and down and pitch, while reducing or even eliminating transverse and fore-and-aft translation, as well as rolling and yawing.

As shown in FIGS. 3, 9, and 10, the pivot member 250 defines two transverse pivot axes: a first pivot axis 252 and a second pivot axis 254. The pivot member 250 may be pivotally coupled to the chassis 102 at the first pivot axis 252, and pivotally coupled to the support platform 103 at the second pivot axis 254. In the illustrated embodiment, the first and second pivot axes 252, 254 are parallel to one another and transverse to the longitudinal axis 101 (see FIG. 1).

In one embodiment, the second pivot axis 254 is longitudinally located between the first suspension apparatus 202 (e.g., the first and second suspension units 206) and the second suspension apparatus 204 (e.g., the front suspension unit 232). For example, the second pivot axis 254 may pivotally couple to the support platform 103 along the seat support portion 120 between the first and second suspension apparatus 202, 204 (e.g., under the center of mass of the operator). In the illustrated embodiments, the first pivot axis 252 may be located aft of the second pivot axis 254, although, in other embodiments, the first pivot axis 252 could be located forward of the second pivot axis 254.

As shown in FIG. 3, the pivot member may include a transverse shaft 258 defining the first pivot axis 252. Extending outwardly from the shaft 258 is at least one arm 260. In the embodiments illustrated herein, the pivot member 250 includes two such arms 260a, 260b extending perpendicularly from ends of the shaft 258 such that the pivot member 250 forms a generally U-shaped component. Distal ends of the arms 260 define coaxial features (e.g., openings, pins, etc.) that together define the second pivot axis 254.

FIG. 9 illustrates a partial section view of the mower 100 with the support platform 103 in a first or static (unsprung) position, while FIG. 10 illustrates the same view with the support platform 103 in a deflected position. In the first position, the first and second suspension apparatus 202, 204 are shown in an initial or non-compressed state (subject only to the static load 262 of the support platform structure and operator). In the second position (see FIG. 10), the first and second suspension apparatus 202, 204 are shown after compression resulting from a dynamic force being imparted to the chassis 102. As shown in FIG. 10, the first and second suspension apparatus 202, 204 may compress in response to the force. Moreover, the dampers provided in each of the suspension units 206, 232 may influence both the compression and extension of the suspension units.

As evident in FIGS. 9 and 10, the support platform 103 and seat 112 may both move vertically, and pitch slightly, as they travel through the expected range of motion permitted by the suspension system 200. However, the pivot member 250 may again restrict less desirable side-to-side and fore-and-aft translation, as well as yaw and roll motions of the support platform 103. Of course, the pivot member 250 could be configured to permit other motions of the support platform 103 relative to the chassis 102 where such other motion(s) may be beneficial. For instance, one or both of the first and second pivot axes 252, 254 may include a resilient component that permits transverse and/or fore-and-aft motion of the pivot member relative to the support platform and/or the chassis.

Accordingly, suspension systems in accordance with embodiments of the present disclosure may provide the operator with a more comfortable ride than may otherwise be experienced, especially on rough terrain. Additionally, embodiments of the present disclosure may allow individual operators to tune the spring and damping rates of the suspension system. For example, changing the position of the second mounting point 214 along the slot 222 (e.g., changing the orientation of the first suspension apparatus) changes not only the spring rate of the respective suspension unit 206, but the damping rate as well (e.g., in the vertical direction). As a result, the suspension system may be adjusted to suit the operator's weight and/or ride stiffness preference.

Another benefit of suspension systems like those described herein is that the support platform 103 supports not only the operator upon the seat 112 (e.g., via the seat support portion 120), but also the operator's feet (e.g., via the foot support portion 122). As a result, relative movement between the operator's upper and lower body may be reduced.

Illustrative embodiments are described and reference has been made to possible variations of the same. These and other variations, combinations, and modifications will be apparent to those skilled in the art, and it should be understood that the claims are not limited to the illustrative embodiments set forth herein.

What is claimed is:

1. A grounds maintenance vehicle comprising:
   a chassis supported upon a ground surface by ground contact members, the chassis defining a front end, a rear end, and a longitudinal axis extending between the front and rear ends;
   a support platform extending along the longitudinal axis, the support platform comprising: a seat support portion; a foot support portion; and a connecting structure rigidly connecting the seat support portion to the foot support portion; and
   a suspension system comprising a first suspension apparatus and a second suspension apparatus, wherein each of the first and second suspension apparatus is operatively connected to the chassis and to the support platform, the second suspension apparatus being connected to a bracket of the seat support portion of the support platform, and the first suspension apparatus being connected to the support platform at a longitudinal location that is aft of the bracket, the first suspension apparatus comprising a suspension unit and a second suspension unit laterally offset from the first suspension unit, wherein the first and second suspension units are pivotable within a vertical plane transverse to the longitudinal axis.

2. The vehicle of claim 1, further comprising a pivot member defining a transverse first pivot axis and a transverse second pivot axis, wherein the pivot member is: pivotally coupled to the chassis at the first pivot axis; and pivotally coupled to the support platform at the second pivot axis, wherein the second pivot axis is located along the longitudinal axis between the first suspension apparatus and the second suspension apparatus.

3. The vehicle of claim 2, wherein the pivot member comprises a shaft and first and second arms extending outwardly from the shaft, the shaft defining the first pivot axis of the pivot member and distal ends of the first and second arms define the second pivot axis.

4. The vehicle of claim 1, wherein pivotal movement of the first suspension unit is adapted to alter one or both of a spring rate and a damping rate of the first suspension unit in at least one direction.

5. The vehicle of claim 1, wherein the support platform defines front and rear ends and left and right sides, wherein the first suspension apparatus is positioned at or near the rear end of the support platform.

6. The vehicle of claim 5, wherein the second suspension apparatus is positioned equidistant from the left and right sides of the support platform.

7. The vehicle of claim 1, further comprising:
a seat coupled to the seat support portion of the support platform; and
an isolator located between the seat and the support platform.

8. The vehicle of claim 1, further comprising drive control levers pivotally coupled to the chassis.

9. A grounds maintenance vehicle comprising:
a chassis supported upon a ground surface by ground contact members, the chassis defining a front end, a rear end, and a longitudinal axis extending between the front and rear ends;
a support platform comprising a foot support portion and a seat support portion;
a suspension frame connected to the support platform, wherein the suspension frame comprises a support portion and first and second branch portions, the first and second branch portions attached to the support platform via the support portion, wherein the first and second branch portions are spaced-apart from one another, and wherein the first and second branch portions lie within a vertical plane transverse to the longitudinal axis; and
a suspension system connecting the chassis with the support platform, the suspension system comprising:
a first suspension unit comprising a first mounting point coupled to the chassis, and a second mounting point adapted to couple at any of a plurality of user-adjustable positions along the first branch portion of the suspension frame; and
a second suspension unit comprising a first mounting point coupled to the chassis, and a second mounting point adapted to couple at any of a plurality of user-adjustable positions along the second branch portion of the suspension frame.

10. The vehicle of claim 9, wherein the first mounting points of the first and second suspension units are pivotally coupled to the chassis at first and second pivot axes, respectively.

11. The vehicle of claim 9, wherein the plurality of user adjustable positions in both of the first and second branch portions are defined by first and second arcuately shaped slots, respectively, formed in the first and second branch portions of the suspension frame.

12. The vehicle of claim 11, wherein each of the second mounting points of the first and second suspension units comprises a retention member, wherein each retention member is reconfigurable between a loosened configuration, wherein the second mounting point is adapted to slide along its corresponding slot, and a tightened configuration, wherein the second mounting point is immobilized relative to its corresponding slot.

13. The vehicle of claim 9, wherein movement of the second mounting point of the first or second suspension unit along the first or second branch portion, respectively, alters one or both of an effective spring rate and an effective damping rate of the respective first or second suspension unit.

14. The vehicle of claim 9, wherein the suspension system further comprises a forward suspension unit connecting the chassis with the support platform, wherein the forward suspension unit is longitudinally located both forward of the first and second suspension units, and at or near a junction between the foot support portion and the seat support portion of the support platform.

15. The vehicle of claim 14, further comprising a pivot member defining a transverse first pivot axis and a transverse second pivot axis, wherein the pivot member is: pivotally coupled to the chassis at the first pivot axis; and pivotally coupled to the support platform at the second pivot axis, wherein the second pivot axis is located along the longitudinal axis between the first suspension unit and the forward suspension unit.

16. The vehicle of claim 15, wherein the first pivot axis is located aft of the second pivot axis.

17. The vehicle of claim 9, wherein the suspension frame comprises a T-shaped tower.

18. A grounds maintenance vehicle comprising:
a chassis supported upon a ground surface by ground contact members, the chassis defining a front end, a rear end, and a longitudinal axis extending between the front and rear ends;
a support platform operatively connected to the chassis, the support platform comprising a foot support portion and a seat support portion; and
a suspension system connecting the chassis with the support platform, the suspension system comprising:
a first suspension unit comprising a first mounting point operatively coupled to the chassis, and a second mounting point operatively coupled to the support platform, wherein the first or second mounting point of the first suspension unit is adapted to couple to the chassis or support platform, respectively, at any one of a first plurality of user-adjustable positions; and
a second suspension unit comprising a first mounting point coupled to the chassis, and a second mounting point coupled to the support platform, wherein the first or second mounting point of the second suspension unit is adapted to couple to the chassis or support platform, respectively, at any one of a second plurality of user-adjustable positions;
wherein each user-adjustable position of the first and second plurality of user-adjustable positions is located within a common vertical plane that is transverse to the longitudinal axis.

19. The vehicle of claim 18, wherein the first plurality of user-adjustable positions is provided by a first arcuately shaped slot adapted to receive the second mounting point of the first suspension unit, and the second plurality of use-adjustable positions is provided by a second arcuately shaped slot adapted to receive the second mounting point of the second suspension unit.

20. The vehicle of claim 19, wherein the first and second arcuately shaped slots are formed by first and second branch portions, respectively, of a suspension frame, wherein the suspension frame further comprises a support portion to which the first and second branch portions attach, the support portion connected to the support platform.

* * * * *

UNITED STATES PATENT AND TRADEMARK OFFICE
CERTIFICATE OF CORRECTION

PATENT NO. : 9,499,204 B1  
APPLICATION NO. : 14/704062  
DATED : November 22, 2016  
INVENTOR(S) : Gust et al.

It is certified that error appears in the above-identified patent and that said Letters Patent is hereby corrected as shown below:

In the Specification

Column 9, Line 10, "22a" should read --224a--.

In the Claims

Column 12, Line 59, "a suspension" should read --a first suspension--.

Column 14, Lines 62-63, "use-adjustable" should read --user-adjustable--.

Signed and Sealed this  
Ninth Day of January, 2018

Joseph Matal  
*Performing the Functions and Duties of the*  
*Under Secretary of Commerce for Intellectual Property and*  
*Director of the United States Patent and Trademark Office*